United States Patent [19]

Jervis

[11] Patent Number: 4,610,738
[45] Date of Patent: Sep. 9, 1986

[54] ENCAPSULATING A SPLICE WITH A GEL-FILLED CASE

[75] Inventor: James E. Jervis, Atherton, Calif.

[73] Assignee: Raychem Corporation, Menlo Park, Calif.

[21] Appl. No.: 688,849

[22] Filed: Jan. 4, 1985

[51] Int. Cl.$^4$ ............................................. H02G 1/14
[52] U.S. Cl. .................................... 156/49; 156/48; 156/51; 174/76; 174/92; 339/116 C
[58] Field of Search ............... 156/48, 49, 51; 174/76, 174/92; 339/116 C

[56] References Cited

U.S. PATENT DOCUMENTS

| | | | |
|---|---|---|---|
| 3,138,657 | 6/1964 | Wengen | 174/92 |
| 4,435,612 | 3/1984 | Smith | 174/92 |
| 4,504,699 | 3/1985 | Dones et al. | 174/76 X |

OTHER PUBLICATIONS

Debbaut U.S. patent application Ser. No. 504,000 filed Jun. 13, 1983.

Primary Examiner—Robert A. Dawson
Attorney, Agent, or Firm—Ira David Blecker

[57] ABSTRACT

A splice case for encapsulating a substrate includes first and second containers each of which contain a gel having a cone penetration between 100 and 350 ($10^{-1}$ mm) and an ultimate elongation of at least 200%, the gel in each container having an exposed surface, one exposed surface having a cross-sectional area larger than the cross-sectional area of the other exposed surface, the first and second containers being adapted for telescopic engagement. The substrate is located on one of the exposed surfaces of the gel, and the containers are arranged such that the exposed surfaces of the gel of the first and second containers contact each other and are maintained in compressive contact by a spring capable of maintaining a sufficiently large spring force to repel environmental contamination (for example, water) regardless of the engagement of the containers in response to the biasing force of the spring, substrate volume, or other external factors such as expansions and contractions caused by, for example, temperature changes.

13 Claims, 2 Drawing Figures

U.S. Patent  Sep. 9, 1986  4,610,738
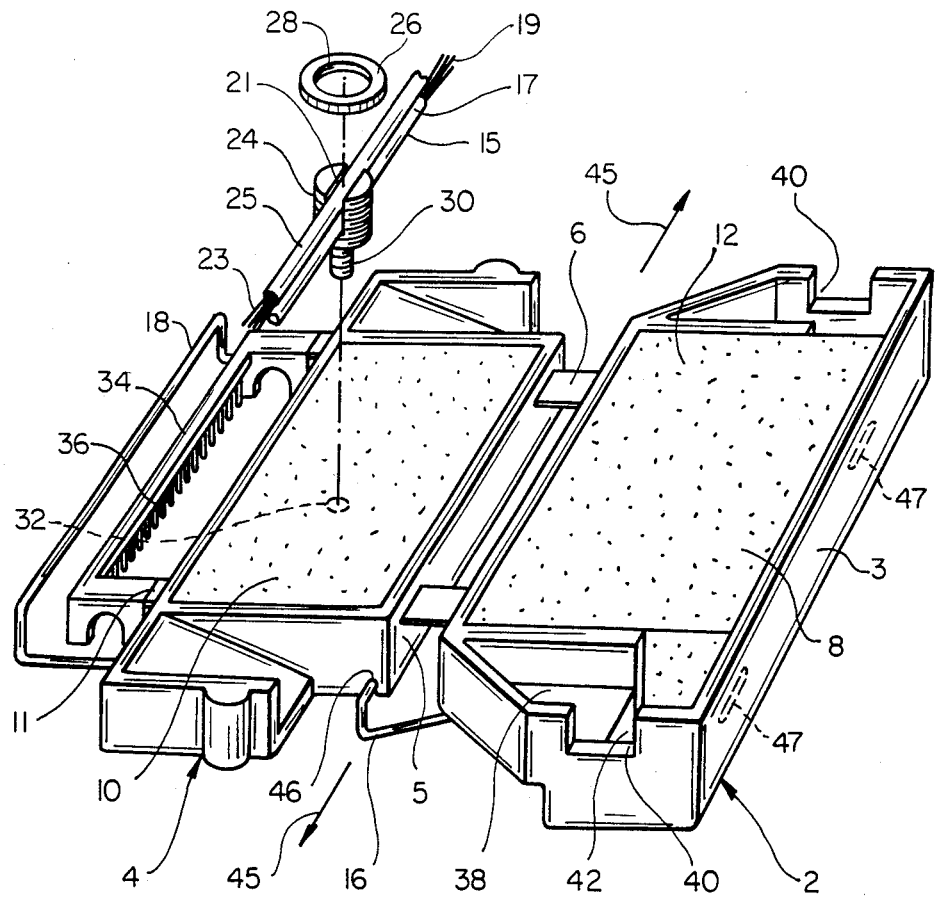
FIG_1
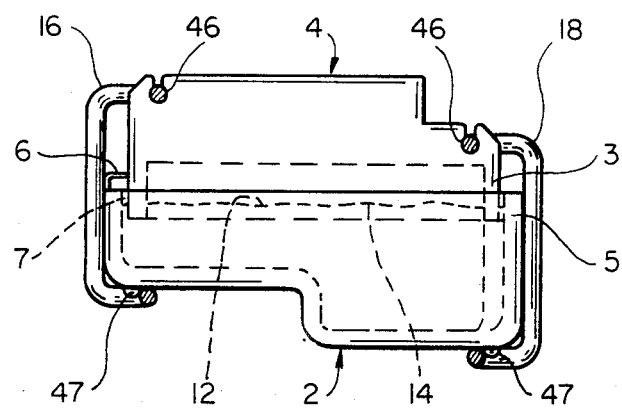
FIG_2

ENCAPSULATING A SPLICE WITH A GEL-FILLED CASE

BACKGROUND OF THE INVENTION

1. Field of the Invention

The present invention relates to a splice case for encapsulating a substrate, especially splices between electrical conductors.

2. Description of the Prior Art

It is often desirable to protect substrates from environmental effects such as moisture, a typical example being the protection of a splice between first and second electrical conductors from either water or moisture in air. There are several known methods of protecting substrates, and in particular, electrical conductors, and more particularly, splices between electrical conductors. Such methods include the use of greases and gels surrounding the electrical conductors and the splices. A typical problem with greases is that they lack virtually any three-dimensional structure and hence no elongation and accordingly the greases oftentimes tend to flow from the area in which they are intended to environmentally protect, especially when subjected to external forces. Though gels, as more particularly described herein, have a three-dimensional network resulting in finite elongation properties which tends to maintain the gel in contact with the substrate being protected even when the gel is placed under an external load, oftentimes sufficient contact between the substrate being protected and the gel is not maintained over time due to dynamic changes which may occur. Such changes include changes in container sizes utilized to hold the gel due to material creep, changes in volume induced by temperature variations, etc. In addition, prior art methods of protecting substrates generally are not capable of adequately protecting a variety of different-sized substrates using a single apparatus.

SUMMARY OF THE INVENTION

Accordingly, it is an object of the present invention to provide means for protecting a substrate from the environment.

It is a further object of the invention to provide means for encapsulating a substrate, which means protects the substrate from the environment at all times, is easily re-enterable, and capable of accommodating any one of a variety of different-sized substrates.

These and other objects are achieved by the provision of a splice case for encapsulating a substrate, the splice case including first and second containers having a pre-cured gel therein, the gel in the first container having an exposed first surface which has a cross-sectional area greater than a cross-sectional area of an exposed second surface of the gel in the second container, the first and second containers thereby being sized so as to be capable of telescopic movement when the exposed surfaces of the gel are in contact with each other, and further including spring means for maintaining the first and second surfaces in contact and biased against one another, the spring means maintaining a biasing force regardless of dynamic changes such as deformation of the containers in response to the biasing force, expansions and contractions caused by temperature variations, etc. Accordingly, the first and second gel surfaces are maintained in contact by at least a predetermined minimum pressure, which pressure is calculated to always exceed a maximum expected water pressure which may be applied externally to the splice case or may be applied along a cable connected to the substrate being encapsulated so as to positively keep water and moisture from the substrate. A range of the telescopic movement is maintained sufficiently large so that a predetermined size range of substrates can adequately be encapsulated over an entire range of expected or anticipated dynamic variations. Preferably, the substrate comprises electrical conductors, the invention being especially suitable for encapsulating electrical conductors and splices therebetween, most especially telephone electrical conductors.

The invention further includes means for maintaining cables containing the electrical conductors in place in one of the containers, the maintaining means including a split bolt and nut assembly, and an organizer is further provided for organizing individual electrical conductors to facilitate their identification for splicing.

BRIEF DESCRIPTION OF THE DRAWINGS

FIG. 1 is a perspective view of a prefered embodiment of a splice case of the invention illustrated in an open position;

FIG. 2 is a plan view of the splice case in a closed position.

DESCRIPTION OF THE PREFERRED EMBODIMENTS

FIG. 1 illustrates a preferred embodiment of a splice case of the invention. The splice case includes first and second mating containers 2, 4 interconnected by flexible hinge members 6 which allow relative movement between the containers. First and second springs 16, 18 are utilized to maintain the first and second containers in a closed position, as illustrated in FIG. 2, the first and second springs being fixedly attached to the second container 4 at points 46 and being releasably connectable to bosses 47 of the first container.

Each container 2, 4 contains a mass of gel 8, 10, the gel being of any of the types described in co-pending application Ser. Nos. 434,011 filed Oct. 12, 1982, 504,000, filed June 13, 1983; 507,433 filed June 23, 1983 (now abandoned); and 507,435 filed June 23, 1983 (now abandoned), the disclosure of which are incorporated herein by reference. Specifically, the gels 8, 10 have a cone penetration value from approximately 100 to 350 ($10^{-1}$ mm), preferably between 240 and 330 and most preferably between 270 and 300; an ultimate elongation of at least approximately 200%; and a cohesive strength greater than an adhesive strength of an exposed surface of the gel to itself or a similar gel. The stated parameters for the cone penetration and elongation are provided in accordance with the American National Standard Designation ASTM D217 and ASTM D738, respectively. A viscous flow of the gel is such that it tends to conform around an outer surface of an object suppressed therein, and exerting pressure on the gel increases the degree and quality with which the gel conforms to the object.

The gel 8, 10 preferably has exposed first and second surfaces 12, 14 which are tacky and hydrolytically stable, though the surfaces 12, 14 do not necessarily need to be tacky. The gel is moisture insensitive and substantially inert towards the materials making up the containers 2, 4, as well as conductors 19, 23 and splices therebetween being encapsulated. The gel is further electrically insulating and has a volume resistivity of at least approximately $10^9$ ohms/cm. Such gels can be formed from urethane compositions and silicone compositions as described in the applications cited above. The composition of the gel 8 can be identical to that of the gel 10 or the compositions of the gels 8, 10 can differ so as to optimize the respective properties of the gels so that one gel has a higher cone penetration than the other such that the conductors and splices will tend to be embedded preferentially within one gel over the other. Other variations in the properties between the gels can be optimized as desired.

When the splice case is in an open position as illustrated in FIG. 1, a cross-sectional area of the first surface 12 of the gel 8 in the container 2 exceeds a cross-sectional area of the second surface 14 of the gel 10 in the container 4. Accordingly, in a closed position of the splice case, generally illustrated in FIG. 2, where the container 4 is rotated about a center line 14 of the hinges 6 so that the surface 14 contacts the gel surface 12, side walls 3, 5 of the containers 2, 4 are capable of a finite amount of telescopic movement when subjected to the bias force of the springs 16, 18. A clearance 7 between the side walls 3, 5 is controlled when forming the containers 2, 4 so as to minimize and control an amount of gel tending to be forced outside the containers. In a preferred embodiment, an elasticity of the gels 8, 10 is determined, and all clearances 7 are sized so as to control the amount of gel tending to escape the containers, and in no case is the gel allowed to escape to such an extent that its maximum elongation is exceeded causing the gel to break, or that all of the finite telescopic movement is utilized.

The springs 16, 18 exert sufficient compression forces between the containers 2, 4 such that the exposed surfaces 12, 14 are maintained in pressure contact regardless of any external factors which may tend to otherwise relieve the pressure, such as (1) deformation of bottom or side surfaces of the containers 2, 4 caused by the pressure induced by material creep, (2) differential expansion and contraction of materials caused by temperature variations, etc. Preferably the springs are constructed so as to maintain a pressure between the surfaces which exceeds any anticipated water pressure to which the splice case or conductor cables 15, 25 may be exposed over the range of telescopic movement. An amount of the telescopic movement available between the containers 2, 4 and the dynamic range of the springs 16, 18 is chosen so that a variety of different-sized substrates can be encapsulated over an entire range of expected or anticipated variations caused by the external factors by using fixed-sized containers and springs, thus making the splice case extremely versatile. Accordingly, water is positively prevented from coming in contact with any contents of the splice case, such as splices embedded in the gel 8, 10. Furthermore, the spring pressure enhances conformance between the gel and the splices, the electrical conductors connected by the splices, and the cables from which the electrical conductors extend.

The splice case advantageously may further include a split bolt 24 and mating nut 26 capable of being interconnected via threads 28. The slit bolt includes a pin extension 30, which fits in hole 32 and the container 4 for maintaining the bolt and cables 15, 25 in position relative to the container 4 in use. In addition, if desired, a conductor organizer 34 is attached to the container 4 via second flexible hinges 11, the organizer 34 including a plurality of organizer pins 36.

Openings 40 are sized and tailored so as to closely conform to a size of the cables 15, 25 being spliced so as to minimize escape of gel through the openings 40 the same way as an amount of gel escaping through the clearances 7 is minimized. A reservoir 38 has an exterior slot 42 through which the cables 15, 25 may extend from opposite sides of the splice case.

The operation of the splice case of the invention will be described by reference to encapsulating telephone cables having grounding shields 17 thereon and plurality of electrical conductors 19, 23 extending outwards from the cables. As schematically illustrated in FIG. 1, the first and second cables 15, 25 are inserted within a slot 21 of the split bolt 24, the cables extending out from the slot in opposite directions, and the nut 26 is threadably engaged with the split bolt via the threads 28 so as to tightly compress the cables 15 against each other thereby providing electrical contact between the grounding shields 17. The wire organizer is then folded over the exposed gel surface and the split bolt 24 is inserted in the gel 10 by inserting the pin extension 30 through the hole 32, fixing the splice into the case. The electrical conductors 19 of the first cable 15 are then organized by utilizing selective ones of the pins 36 of the wire conductor organizer 34, and likewise the electrical conductors 23 of the second cable 25 are organized with similar ones of the pins 36, and desired splices between the electrical conductors 19 and 23 are then made. Thereafter, the container 4 is rotated about the rotation line 45 of the hinges 6 so that the surface 14 contacts the gel surface 12 as generally illustrated in FIG. 2, and the containers 2, 4 are maintained in compressive contact via the springs 16, 18 by engagement with the bosses 47. Since the springs 16, 18 exert a "live" compressive force between the surfaces 12, 14 of the gel, and since this compressive force is preferentially maintained higher than any anticipated water pressure to which the splice case and cables will be subjected, the splices, electrical conductors 19, 23 and cables 15, 25 including their shields are protected against moisture and other environmental contaminants regardless of any creep or relaxation of materials making up the containers 2, 4, and changes induced by differential thermal contractions and expansions due to temperature changes of various material forming the splice case, etc., and a well insulated splice case results.

Though the invention has been described by reference to a preferred embodiment wherein splices are encapsulated, it should readily be appreciated that the invention is usable in any environment where any material or substrate is to be encapsulated and protected from the environment, and is not limited solely to encapsulating splices or splices between wires held in cables having shielding conductors therearound, and accordingly all such variations of the invention are included within the scope thereof.

What is claimed is:

1. A splice case for encapsulating a substrate comprising:
at least one gel having a cone penetration value from approximately 100 to 350 ($10^{-1}$ mm) and an ultimate elongation of at least approximately 200%;
first and second open containers for containing said gel, an exposed first surface of said gel in the first container having a cross-sectional area which exceeds a second cross-sectional area of an exposed second surface of said gel in the second container, said first and second surfaces adapted for confronting and contacting each other, the first and second containers being sized so as to be capable of telescopically mating in a vicinity of the first and second surfaces; and spring means exerting a resilient force for continuously maintaining said first and second containers biased towards one another over a finite range with at least a threshold force.

2. The splice case as claimed in claim 1, the spring means continuously maintaining said first and second gel surfaces in contact and biased towards one another.

3. The splice case as claimed in claim 1, a cohesive strength of the gel exceeding an adhesive strength of the first and second gel surfaces.

4. The splice case as claimed in claim 1, the substrate including at least one electrical conductor, the substrate being disposed in a volume of the gel in a vicinity of an interface between the first and second surfaces.

5. The splice case as claimed in claim 4, the substrate including at least one second conductor and a splice between the first and second conductors.

6. The splice case as claimed in claim 2, the spring means being releasable so as to allow the first and second gel surfaces to be separated from one another.

7. The splice case as claimed in claim 2, the first and second containers being sized so as to control a spacing between side walls thereof when the first and second gel surfaces are in contact, the size of the spacing being maintained small enough and a spring force of the biasing means being controlled so as not to allow an ultimate elongation of the gel to be exceeded.

8. The splice case as claimed in claim 5, the first and second containers having slots formed on opposite sides thereof for allowing passage of the electrical conductors into the containers.

9. The splice case as claimed in claim 8, further comprising means for holding the electrical conductors in a predetermined position in one of the containers.

10. The splice case as claimed in claim 3, the gel having a cone penetration betwen 270 and 300 ($10^{-1}$ mm).

11. The splice case as claimed in claim 5, the substrate including a plurality of the first conductors a plurality of the second conductors and a plurality of splices therebetween and further comprising means for organizing all the conductors and splices within the gel.

12. The splice case as claimed in claim 2, the gel in the first container having a composition substantially the same as the gel in the second container.

13. A method of encapsulating a splice between first and second electrical conductors, comprising the steps of:

placing a splice on an exposed first surface of a gel contained in a first container;

placing the exposed first surface of the gel in contact with an exposed second surface of a second gel in a second container such that the splice is surrounded by the gel in the first and second containers, the first and second gels having a cone penetration between 100 and 350 ($10^{-1}$ mm), and an ultimate elongation of at least approximately 200%; and maintaining a continuous pressure by exerting a resilient force between the first and second gel surfaces.

* * * * *